May 1, 1934.  A. DINA  1,957,201
SUPPORT FOR MOTION PICTURE PROJECTOR DRIVE SHAFTS
Filed June 25, 1930  5 Sheets-Sheet 1

May 1, 1934.  A. DINA  1,957,201
SUPPORT FOR MOTION PICTURE PROJECTOR DRIVE SHAFTS
Filed June 25, 1930   5 Sheets-Sheet 2

INVENTOR
Augusto Dina
BY
Austin + Dix
ATTORNEYS

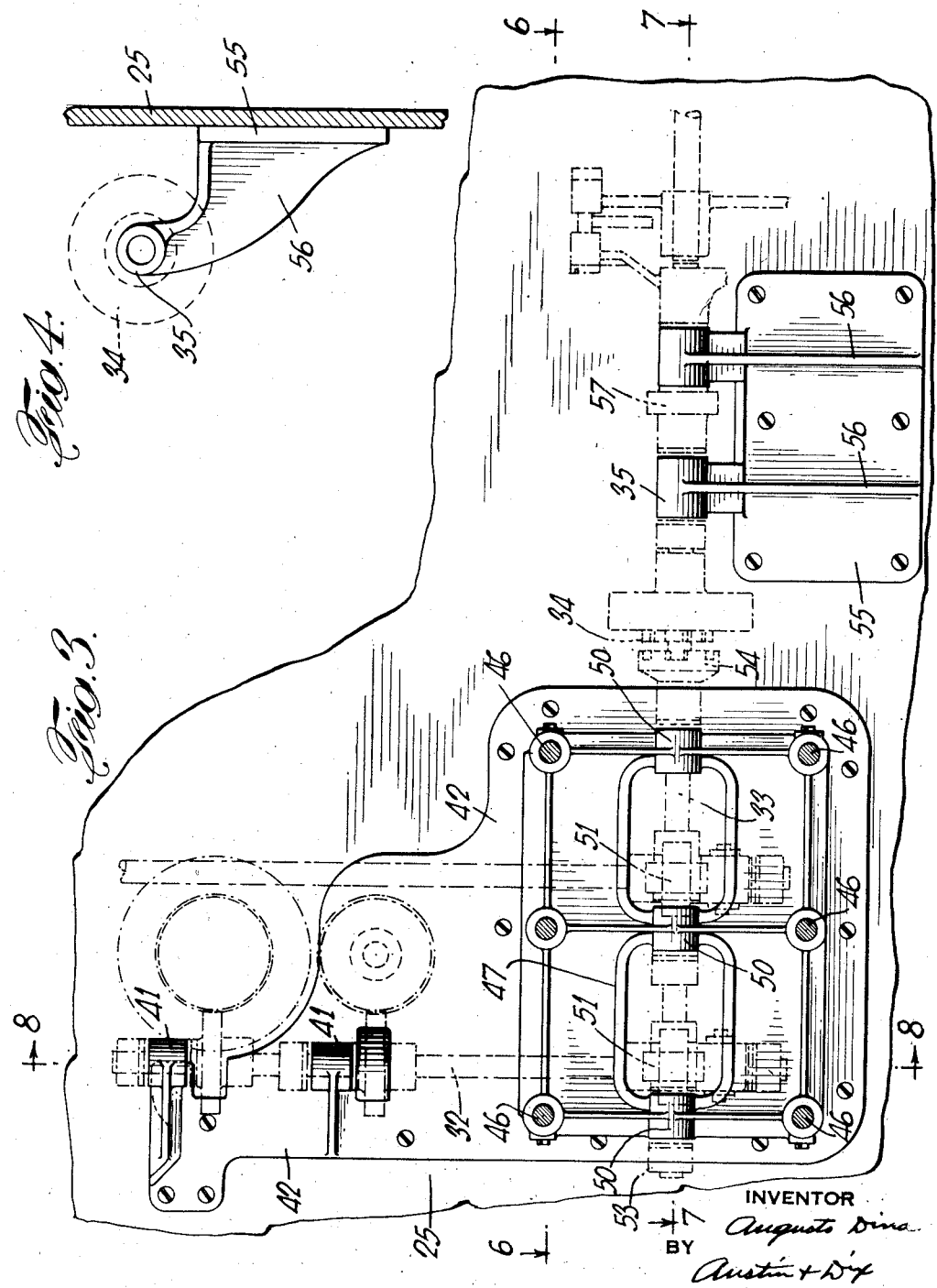

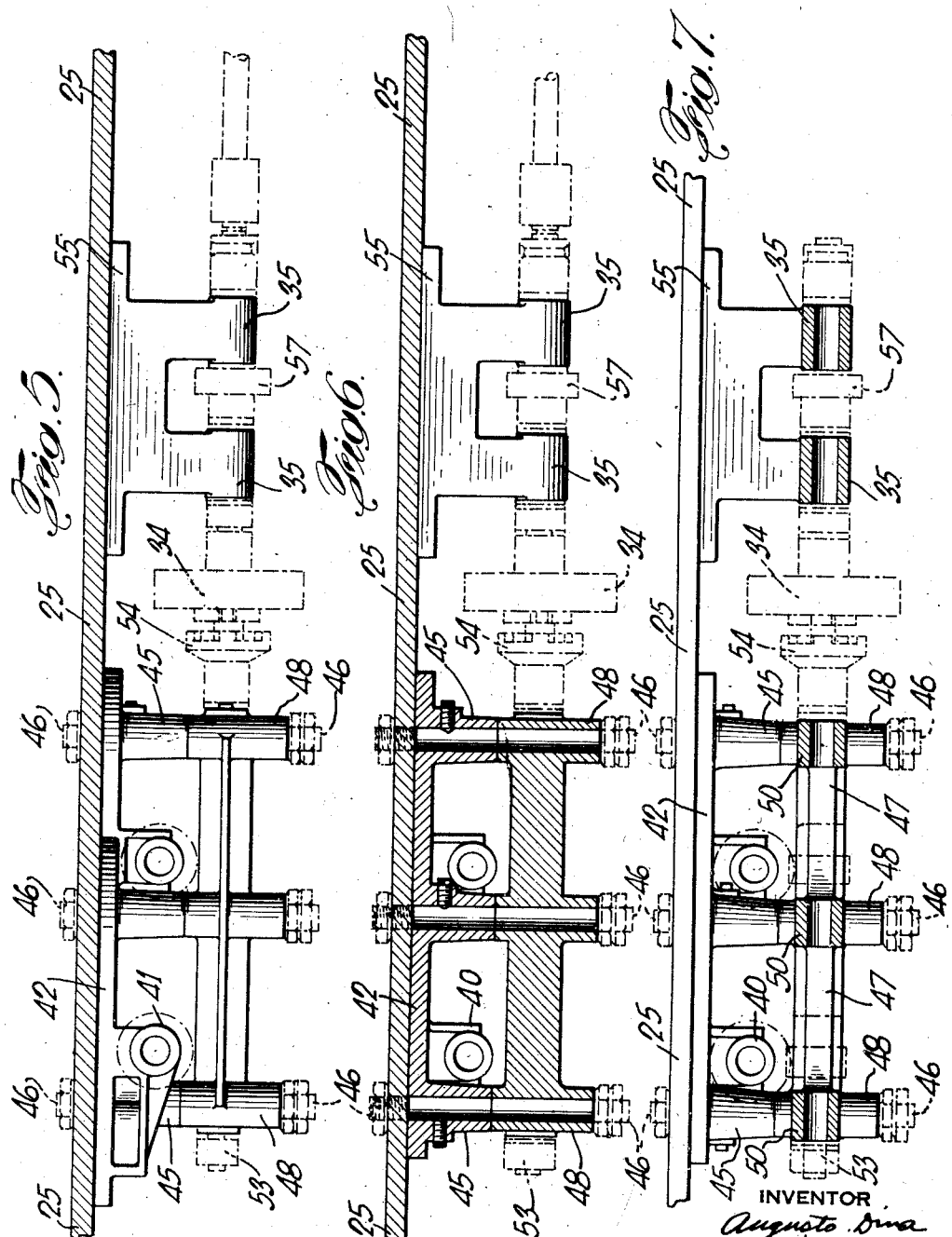

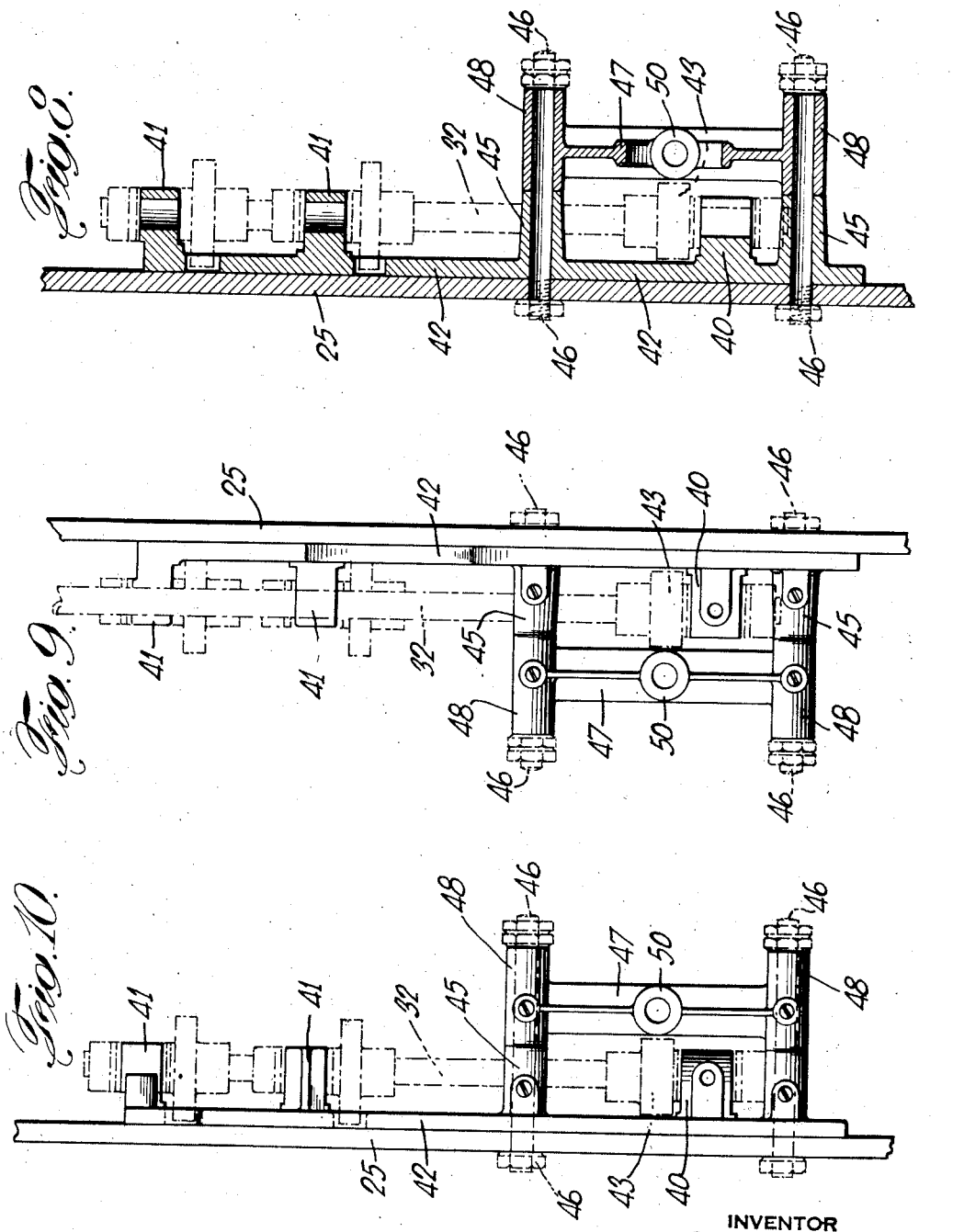

Patented May 1, 1934

1,957,201

UNITED STATES PATENT OFFICE 1,957,201

SUPPORT FOR MOTION-PICTURE-PROJECTOR DRIVE SHAFTS

Augusto Dina, Elizabeth, N. J., assignor to International Projector Corporation, New York, N. Y., a corporation of Delaware Application June 25, 1930, Serial No. 463,714

4 Claims. (Cl. 88—17)

This invention relates to projection machines, and more particularly to a new and improved support for the driving mechanism of a portable projection machine.

An object of the invention is to provide a cheap, simple, compact and efficient support for the drive shafts and gears of a projection head.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of a projection head showing the driving mechanism and support;

Fig. 3 is an enlarged detail of the supporting mechanism;

Fig. 4 is a side elevation of the supporting bracket for the main drive shaft;

Fig. 5 is a top plan view of the improved support;

Fig. 6 is a section taken on the line 6—6 of Fig. 3;

Fig. 7 is a section taken on the line 7—7 of Fig. 3;

Fig. 8 is a section taken on the line 8—8 of Fig. 3;

Fig. 9 is a rear elevation of the support; and

Fig. 10 is a front elevation of the support.

Like reference characters denote like parts in the several figures of the drawings.

Figure 1:
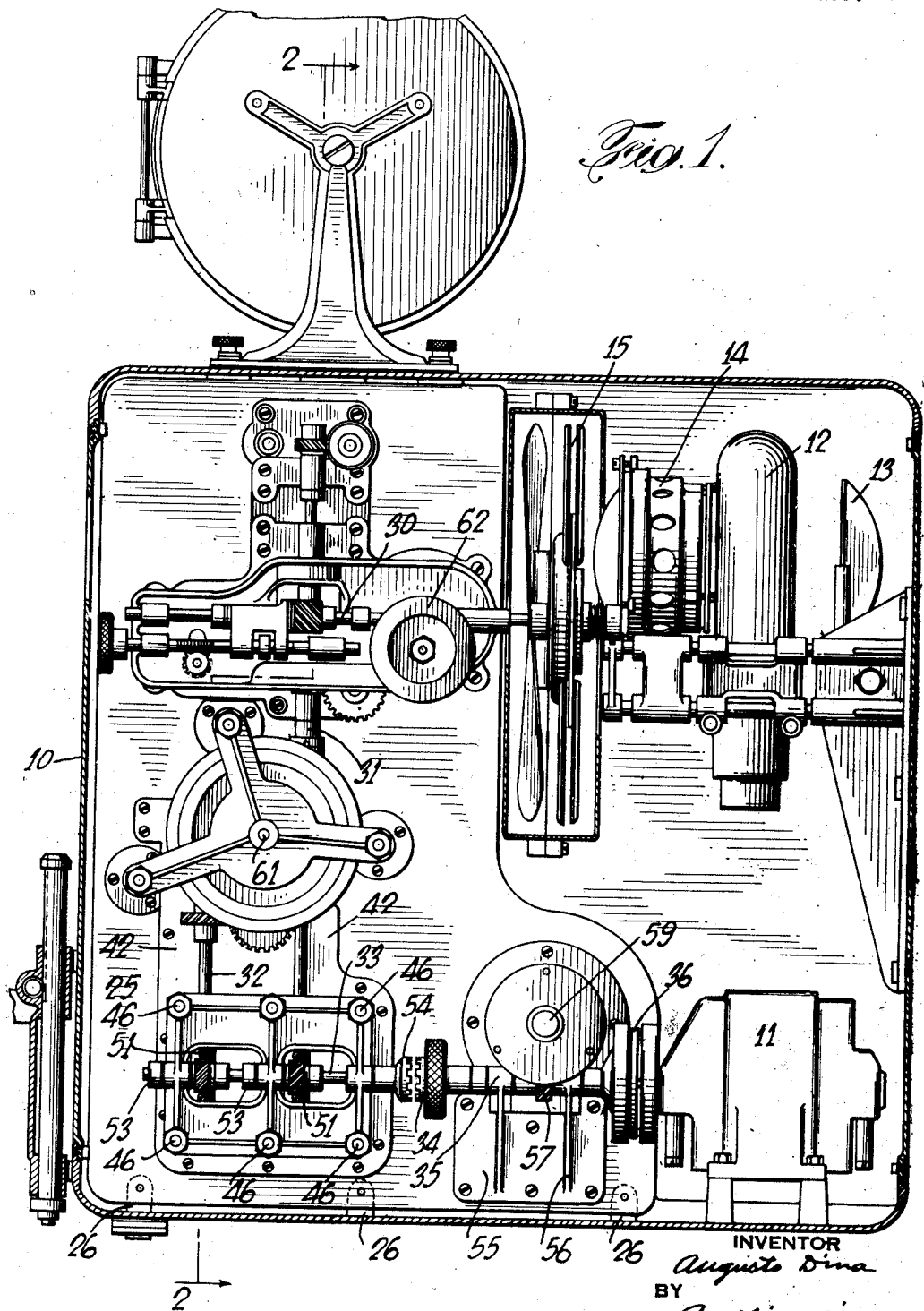
Figure 2:
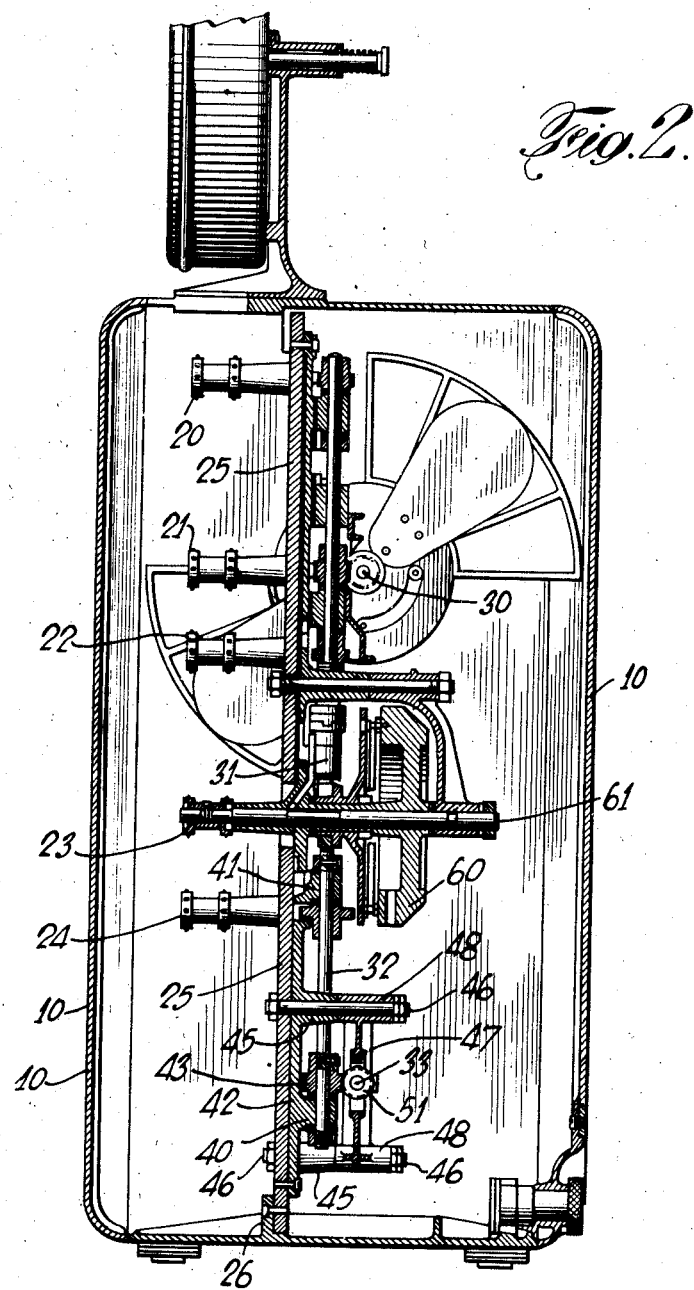
Fig. 2 is a transverse section taken on the line 2—2 of Fig. 1.

In the following description and in the claims parts will be identified by specific names for convenience, but they are intended to be as generic in their application to similar parts as the art will permit.

Referring to the drawings more in detail the invention is shown as applied to a projection head for a portable projection machine having a casing 10 carrying a driving motor 11, film driving apparatus to be described, and a light system comprising lamp 12, reflector 13, lens assembly 14 and shutters 15.

The film drive comprises an upper feed sprocket 20, intermittent sprocket 21, continuous sprocket 22, sound sprocket 23 and lower feed sprocket 24, over which the film is passed in the order named. These sprockets and the driving mechanism therefor are mounted on a vertical frame 25 which is carried by casing 10 in any convenient manner as by flanges 26 to which said frame may be riveted.

Sprockets 20 and 22 and shutter shaft 30 are driven from a vertical drive shaft 31. Intermittent sprocket 21 is driven from shutter shaft 30 by suitable gears. Sprockets 23 and 24 are driven from vertical drive shaft 32. Shafts 31 and 32 are driven from the main horizontal drive shaft 33 which is connected through clutch 34 to drive shaft 35. Said shaft 35 is connected to a motor 11 through a flexible coupling 36.

The arrangement of the drive shafts above described and the mechanism for driving the various sprockets are set forth in my copending application for Portable talking picture projector Serial No. 425,297, filed February 1, 1930, Patent 1,933,545. The present invention particularly relates to the mechanical support for the various driving shafts.

Shafts 31 and 32 are secured in bosses 40 and 41 which are formed in bracket 42. Said bosses are drilled to provide suitable bearings for shafts 31 and 32. Gear wheel 43 is mounted on shaft 32 in engagement with boss 40 and forms a thrust bearing for said shaft 32. A similar gear wheel forms a thrust bearing for shaft 31. Bracket 42 is provided with a plurality of extensions 45 which are drilled to receive bolts 46.

Shaft 33 is mounted in a drive shaft support 47 which is provided with a plurality of tubular projections 48 in alignment with projections 45 of bracket 42 and drilled to receive bolts 46. Support 47 is mounted on bracket 42 and the entire assembly held in position on frame 25 by bolts 46.

Support 47 is provided with a plurality of bearings 50 in which shaft 33 is journalled. Said shaft is provided with a plurality of gears 51 which mesh with cooperating gears on shafts 31 and 32. Shaft 33 is held against longitudinal displacement by said gears 51 and by collars 53 which are mounted on said shaft in engagement with bearings 50. A clutch element 54 is secured to the end of shaft 33 in a position to engage clutch 34 for connecting the various shafts in driving relationship.

Shaft 35 is mounted in bracket 55 which is provided with a pair of lateral projections 56 in which said shaft is journalled. Bracket 55 is mounted on frame 25 in any convenient manner. A gear 57 is carried on shaft 35 between projections 56 in driving relationship with take-up mechanism 59.

In the above described mechanism it is to be noted that the various units of the device may be independently removed, for example, shaft 35 is entirely supported in bracket 55 and may be removed from the machine for purposes of inspection of repair by disconnecting flexible coupling member 36 and removing bracket 55. Drive shaft 33 may be taken from the machine by loosening bolts 46 and removing supporting member 47 in which said shaft is journalled. All of this may be accomplished without disturbing bracket 42 which supports shafts 31 and 32. The lower shafts may be removed from the projection head as a unit with bracket 42, or they may be released from their bearings 40 and 41 without disturbing said bracket.

It is to be understood that suitable gears interconnect the various shafts above described and that suitable lubricating means is provided for each of the bearings. The particular driving mechanism for the various sprockets and the shutter is not described herein in detail, since they form no part of the present invention.

It is to be noted that clutch 34 permits the driving motor to be disconnected from the various sprockets and enables the take-up mechanism 59 to be operated independently, for example, in rewinding a film. Flexible coupling 36 serves to take up any inequalities in drive and prevents strains in various parts. It is to be understood that various fly wheels and flexible couplings may be employed for other parts of the mechanism, as for example, fly wheel 60 and flexible coupling member 61 in connection with sound sprocket 23 and fly wheel 62 in connection with the drive for intermittent sprocket 21.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a projection head, a vertical frame carrying a film driving apparatus, a plurality of vertical drive shafts operatively associated with said apparatus, a bracket carrying said drive shafts, a horizontal drive shaft in driving engagement with said vertical shafts, a support carrying said horizontal shaft, means for mounting said support on said bracket comprising a plurality of bosses formed on said bracket and said support respectively in aligned positions, and securing means extending through said bosses and said frame.

2. In a projection head, a vertical frame carrying a film driving apparatus, a pair of vertical drive shafts in driving engagement with said apparatus, a bracket secured to said frame and carrying said shafts, a horizontal drive shaft in driving engagement with said vertical shafts, a support for said horizontal shaft, said support being mounted on said bracket, a driving motor, a main driving shaft associated therewith, a bracket carrying said driving shaft in alignment with said horizontal shaft and a clutch for selectively connecting said driving shaft to said horizontal shaft.

3. In a projection head, a vertical frame carrying a film driving apparatus, a plurality of vertical drive shafts operatively associated therewith, a bracket secured on said frame, said bracket having a plurality of bosses in which said vertical drive shafts are journalled, a horizontal drive shaft in driving engagement with said vertical shafts, a supporting plate for said horizontal shaft having a plurality of bearings located centrally thereof, said plate having a plurality of projections around the periphery thereof, projections formed on said bracket in engagement with said peripheral projections and adapted to position said plate, securing means extending through said projections, a main driving shaft and a clutch interconnecting said main driving shaft and said horizontal shaft.

4. In a projection head, a vertical frame carrying a film driving apparatus, a plurality of vertical drive shafts operatively associated therewith, a bracket secured on said frame, said bracket having a plurality of bosses in which said vertical drive shafts are journalled, a horizontal drive shaft in driving engagement with said vertical shafts, a supporting plate for said horizontal shaft having a plurality of bearings located centrally thereof, said plate having a plurality of projections around the periphery thereof, projections formed on said bracket in engagement with said peripheral projections and adapted to position said plate, securing means extending through said projections, a main driving shaft and a clutch interconnecting said main driving shaft and said horizontal shaft and a bracket carrying said main driving shaft and secured to said vertical frame independently of said first mentioned bracket.

AUGUSTO DINA.